United States Patent [19]

Snyder et al.

[11] Patent Number: 4,780,239

[45] Date of Patent: Oct. 25, 1988

[54] ION EXCHANGE RESIN FOR IMMOBILIZING RADIOACTIVE WASTE

[75] Inventors: Thomas S. Snyder, Oakmont; Herbert A. Burgman, Murrysville Boro; Martin D. Nahemow, Pittsburgh, all of Pa.

[73] Assignee: Westinghouse Electric Corp., Pittsburgh, Pa.

[21] Appl. No.: 866,015

[22] Filed: May 22, 1986

[51] Int. Cl.$^4$ .......... C01B 31/16; G21F 9/16; G21F 9/08; C04B 33/32

[52] U.S. Cl. .......... 252/184; 204/192.11; 204/192.15; 204/192.34; 210/679; 210/682; 252/626; 252/629; 252/631; 264/59; 264/63; 502/11; 502/407; 502/413; 502/414; 502/416; 502/429

[58] Field of Search .......... 252/626, 630, 629, 631, 252/179, 184; 502/11, 5, 407, 429, 413–414, 400, 300, 416, 425; 204/192.11, 192.15, 192.34; 264/56, 59, 63; 501/99, 102, 103, 105, 106, 107, 133, 140, 142, 153, 154

[56] References Cited

U.S. PATENT DOCUMENTS

| | | | |
|---|---|---|---|
| 3,485,771 | 12/1969 | Horvath | 252/430 |
| 3,941,630 | 3/1976 | Larrabee | 204/192.11 |
| 4,108,751 | 8/1978 | King | 204/192.11 |
| 4,179,401 | 12/1979 | Garnett et al. | 252/429 R |
| 4,204,980 | 5/1980 | Pasha et al. | 252/629 |
| 4,309,315 | 1/1982 | Nakamura | 252/472 |
| 4,376,709 | 3/1983 | Johnson et al. | 252/1 |
| 4,376,792 | 3/1983 | Angelini et al. | 252/628 |
| 4,432,889 | 2/1984 | Garnett et al. | 502/5 |
| 4,469,628 | 9/1984 | Simmons et al. | 252/629 |
| 4,591,455 | 5/1986 | Macedo et al. | 252/629 |
| 4,632,778 | 12/1986 | Lehto et al. | 252/629 |
| 4,659,512 | 4/1987 | Macedo et al. | 252/629 |

FOREIGN PATENT DOCUMENTS 0131964  7/1985  Japan .......... 204/192.11

OTHER PUBLICATIONS

Banks, et al., 1982, Ion Beam Sputter-Deposited Diamondlike Films, J. Vac. Sci. Technol., 21(3):807–814.

Primary Examiner—Stephen J. Lechert, Jr.
Assistant Examiner—Howard J. Locker
Attorney, Agent, or Firm—Joyce L. Morrison

[57] ABSTRACT

Disclosed is a method of making an ion exchange material. A ceramic material is ion implanted with sulfur, carbon, phosphorus, or nitrogen, which is oxidized to sulfate, carboxylate or carbonate, phosphate, or nitrate, respectively, or the nitrogen is reduced to amine amide. Alternatively, a mixture of ceramic powder and a binder containing sulfur, carbon, phosphorus, or nitrogen is heated in a nonoxidizing atmosphere to a temperature up to 1000° C. The sulfur is then oxidized to sulfate, the carbon to carboxylate or carbonate, phosphorus to phosphate, and nitrogen to nitrate, or the nitrogen is reduced to amine or amide. Also disclosed is an ion exchange material made by these methods and a method of treating acidic aqueous solutions containing dissolved radioactive materials by passing them through an ion exchange column containing the ion exchange material.

15 Claims, No Drawings

ION EXCHANGE RESIN FOR IMMOBILIZING RADIOACTIVE WASTE

BACKGROUND OF THE INVENTION

The safe disposal and containment of radioactive waste has become a problem of increasing concern. Because the radioactive elements are often mixed with large quantities of non-radioactive and non-toxic materials, the quantity of radioactive waste greatly exceeds the quantity of radioactive elements in the waste. While it would be desirable, therefore, to separate the radioactive elements form the remaining materials, this is often impractical or prohibitively expensive, and therefore the entire waste must be disposed of as radioactive waste.

Present methods of disposing of this waste consist of the evaporation of water, if water is present, and encapsulation of the remaining solids in cement or glass. This method must be conducted at a fairly low temperature because some of the radioactive material, such as ruthenium oxides or fluorides, will volatilize at high temperatures. While this method will successfully encapsulate the waste, it is very energy intensive and costly.

Another method of encapsulating the raw waste, when the radioactive elements are dissolved in solution, is to remove the radioactive elements onto ion exchange resins. This effectively separates the radioactive substances from the water, but both the radioactive elements and dissolved non-radioactive ions are removed onto the ion exchange resin, and the resin itself must then be disposed of, which adds to the total quantity of solid waste. In addition, the high radioactivity breaks down the carbon-to-carbon bonds in the ion exchange resins and renders them useless long before their normal life expectancy. Also, some radioactive waste solutions are highly acidic, and the highly concentrated acid can also attack and break down an ion exchange resin.

SUMMARY OF THE INVENTION

We have discovered that an improved ion exchange material can be made by implanting a ceramic material with certain particular chemical moieties. We have further discovered that there are two routes to manufacturing this material.

The ion exchange material of this invention is resistant to attack by acids and can be used to treat very acidic radioactive waste solutions. In addition, because no carbon-to-carbon bonds are present in the ion exchange material, it is not broken down by radiolysis. The ion exchange material of this invention is effective in removing readioactive ions from solutions of radioactive waste. We have also found that by selecting the particular moiety used to implant the ceramic material, the resulting ion exchange material can be made either cationic or anionic.

DESCRIPTION OF THE INVENTION

In the process of this invention for making ion exchange material, a substrate is selected of a ceramic material. Suitable ceramic materials include, for example, zirconia, hafnia, titania, alumina, silica, and mixtures thereof. Zirconia and silica are preferred as they are the most impervious to radiolysis. The ceramic substrate material is usually in the form of a sintered solid powder or bead. A preferred particle size is about 400 mesh to about 20 mesh, although other sizes are also useful. The ceramic substrate can also be used in the form of cylinders, flat plates, or other solid shapes. The ceramic substrate is preferably porous as that increases the number of ion exchange sites and the active surface area that can be used for ion exchange.

An ion exchange material is prepared according to this invention by first placing sulfur, carbon, phosphorus, nitrogen, or mixtures thereof within the ceramic matrix. This can be accomplished by an ion implantation method or by a chemical method. The ion implantation method is preferred to the chemical method because, in the ion implantation method, exchange sites are expected to be more stable under oxidizing conditions, and carbon linkages are expected to be less subject to radiolysis.

Ion Implantation Method

In the ion implantation method, sulfur, carbon, phosphorus, nitrogen, or a mixture thereof is implanted into the surface of the ceramic. Implantation can be accomplished by forming a beam of an ion of one or more of these elements, and directing that beam at the ceramic substrate.

Ion implantation can also be accomplished by depositing the element which will form the exchange group basis (or a compound containing the element) over the surface of the ceramic substrate, and recoiling the element into the substrate by directing a beam of an inert ion, such as argon or nitrogen, at the substrate. This second method is preferred as it is easier to carry out. In this second ion implantation method, a thin film containing the ion exchange element is deposited on the surface of the ceramic substrate. The film may be deposited as a monolayer using, for example, a Longmuir trough. Suitable film materials include compounds having the general formula:

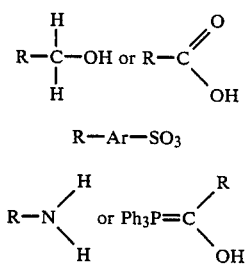

where R is alkyl, Ar is aryl, and Ph is phenyl.

The film on the surface of the ceramic substrate can also be formed by sputtering carbon, phosphorus, or sulfur onto the ceramic surface or by absorbing nitrogen into the surface from a nitrogen atmosphere.

Note that either the final, sintered ceramic form, or ceramic powders, or green ceramic forms are equally suitable candidates for ion implantation. Following the implantation of a green form or a powder to produce a green form, the form or powder may be sintered with little or no effect on the ion exchange moiety.

The ion implantation parameters must be selected according to the particular ion or free radical being implanted. Typical parameters that are suitable include beam energies of about 50 to about 150 KeV, moiety concentrations of $10^{12}$ to about $10^{17}$ moieties per $cm^2$ on the surface of the ceramic substrate, the residence times for the ceramic substrate under the beam of about 60 to about 300 minutes.

Chemical Method

In the chemical method, a mixture is formed of the ceramic substrate (as a powder) and of a binder for the substrate that contains sulfur, carbon, phosphorus, or nitrogen. In the formation of ceramic shapes and various ceramic products, binders are normally added to the green powders to make the green presinter forms. If the ceramic is then sintered at high temperature under oxidizing conditions, the binder, which may also function as a pore former, burns away leaving no trace. But, in this invention, the green presinter form is fired or sintered under non-oxidizing conditions at temperatures well under 1000° C., trapping exchange sites within the ceramic matrix, by driving off all elements in the binder except the sulfur, carbon, phosphorus, and nitrogen.

The binder is preferably about 0.25 to about 1% by weight of the green shape weight, as less may result in fragmentation, and more may give a poor pore structure. A solution of the binder in a solvent is preferred because it allows easier dispersal of the binder in the green powder. The solvent should be sufficiently volatile to boil off or evaporate under the sintering conditions. Ultrafine submicron ceramic particles are mixed with the binder to form agglomerates, pellets or other materials of appropriate shapes for specific applications. In the case of agglomerates, preferred sizes range from −400 mesh up to 20 mesh. The sizes of larger shapes are arbitrary. Normal binders that can be used in this invention include, but are not limited to, materials such as stearic acid, carbowax, sodium stearate, and cellulose. The following table gives illustrative binders that can be used as exchange site donors.

After ion exchange sites have been placed within the ceramic by either the ion implantation method or the chemical method, the sulfur, carbon, phosphorus, or nitrogen in the exchange sites can then be oxidized to sulfate, carboxylate or carbonate, phosphate, or nitrate, respectively, to form a cationic exchange material. Oxidation requires a reasonably strong oxygen source such as, for example, permanganate, peroxide, or a high energy oxygen implantation beam. Alternatively, nitrogen can be reduced with hydrogen to amide or amine to form an anionic exchange material. A mixed cationic-anionic exchange material can be made by mixing cationic exchange material with anionic exchange material after their respective conversion steps.

After the ion exchange material has been prepared, it can be placed in an ion exchange column, as is well known in the art, and solutions containing radioactive or other ions can be passed through the ion exchange bed. These solutions will typically contain about 0 to about 2% dissolved solids, and have a pH of about 0.1 to about 12. Radioactive dissolved ions typically include complexes of Pa(IV), Pa(V), U(IV), U(VI), Am(IV), AM(V), Am(VI), Pu(III), Pu(IV), Pu(V), Pu(VI), $Cs^+$, $Rb^+$, $Fr^+$, and Ru(II→VIII). When the bed has become exhausted, as indicated by a rise in the concentration of ions in the effluent leaving the bed, the ion exchange procedure is terminated. The ions that have been removed onto the ion exchange bed can be eluted from the bed using a strong acid rgeneration solution such as sulfuric, hydrochloric, or nitric acid for cation applications. Alternatively, a strong base such as NaOH

| Final Forms of Exchange Site Cations | | | |
|---|---|---|---|
| Cations or Anions | Binder | | Conversion Treatment |
| carboxyl | Carbowax<br>Stearic Acid<br>Sodium Stearate<br>Cellulose<br>Long Chain Carboxylic Acids | 0.25 to 1 green form<br><.25 - fragments | Mild oxidation using peroxide, permanganate, or high energy oxygen beam for most hydrocarbons. None for the carboxylics. |
| carbonate* | Carbowax<br>Stearic Acid<br>Sodium Stearate<br>Cellulose<br>Long Chain Carboxylic Acids | >1 - poor microstructure | Strong oxidation using peroxide, permanganate, or high energy oxygen beam. |
| surfate | ArSO H or ArSO Cl<br>Where Ar is any aryl group - preferably with a C-10 chain or longer. | | None |
| phosphate | Phosphonium salts with long chain hydrocarbon attachments of the form<br>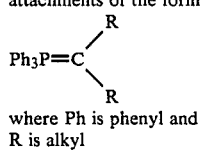where Ph is phenyl and R is alkyl | | None |
| amines | Tertiary amine | | None |
| quaternary ammonium | Long Carbon-Chained Amide or amino linkages of the forms<br>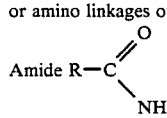 | | None |
| amide | Tertiary amine or long chain amide | | None |

Oxidation or Reduction functions as a regenerant for anion applications. Eluant water can be evaporated and the remaining solid waste can be disposed of by containment within cement, glass, or by other means after the elution cycle is complete. An alternative procedure is to melt the ceramic ion exhange bed into a solid mass without elution or regeneration, which is then stored with the radioactive waste material encapsulated therein.

While the ion exchange material of this invention is most useful in removing radioactive waste from highly acidic solutions, other uses for it will no doubt occur to those skilled in the art. The following examples are intended to further illustrate this invention:

EXAMPLE 1

This example illustrates the chemical route to preparing an ion exchange material according to this invention. A mixture is made of 99 grams of green ceramic zirconia and 1 gram of sodium stearate or zinc stearate binder. The mixture is pelletized to a particle size of 400 to 20 mesh, and is sintered in a furnace at 800° C. for 3 to 5 hours under an atmosphere of hydrogen or argon. The resulting solid shape is a weak acid resin and, in the hydrogen form, can be used to ion exchange a 0.5% aqueous solution of $Cs+$. This results in a quantitative removal of the cation by the resulting carboxylic, weak acid resin with a solution pH between 5 and 14. The service flow rate should be between 1 and 5 $gpm/ft^3$.

EXAMPLE 2

This example illustrates the ion implantation route to preparing an ion exchange material according to this invention. Zirconia powder having a particle size of 400 to 20 mesh is soaked in n-decanol for one hour at room temperature with mild agitation. The resulting slurry is filtered and vacuum dried at room temperature, leaving a decanol coating on the particles. The particles are spread on the stage of the ion implantation device, and a 50 to 150 KeV argon ion beam having a 10 $ma/cm^2$ current density is directed at the particles for 120 to 180 minutes to recoil carbon atoms in the decanol coating into the zirconia matrix of the particles to a depth of up to 1000 Å. The particles are then soaked in concentrated potassium permanganate solution at 250 gms/l at 90° C. for three hours to convert carbon linkages in the zirconia matrix to carboxylate groups. The powder is stacked in a one inch diameter column 60 inches long. Two bed volumes of 2N HCl (aq) is passed over the resin to convert it to the hydrogen form. Then, as a 1% solution of $Cs+$ is passed through the column, the $Cs+$ ions are loaded onto the column as hydronium ions are released from the column until breakthrough is achieved. One to two normal mineral acid is a sufficient eluant to recover the radionuclide ion and regenerate the resin.

We claim:

1. A method of making an ion exchange material comprising:
   (1) implanting a ceramic material with an element selected from the group consisting of sulfur, carbon, phosphorus, nitrogen mixtures thereof;
   (2) oxidizing said sulfur to sulfate, said carbon to carboxylate or carbonate, said phosphorus to phosphate, said nitrogen to nitrate, or reducing said nitrogen to amine or amide, wherein said element is implanted at an energy of at least about 50 KeV and at a concentration of at least about $10^{12}$ moieties per $cm^2$.

2. A method according to claim 1 wherein said element is implanted by directing a beam containing said element at said ceramic material.

3. A method according to claim 1 wherein said element is implanted by coating said ceramic material with a film containing said element, and recoiling said element into said ceramic using a beam of an inert ion.

4. A method according to claim 1 wherein said ceramic material is selected from the group consisting of zirconia, hafnia, titania, alumina, silica, and mixtures thereof.

5. A method according to claim 1 wherein said ceramic material is zirconia.

6. A method according to claim 1 wherein said ceramic material is silica.

7. A method according to claim 1 wherein said ceramic material has a particle size of about 400 to about 20 mesh.

8. A method according to claim 1 wherein said element is implanted at an energy of about 50 to about 150 KeV, a concentration of about $10^{12}$ to about $10^{17}$ moieties per $cm^2$, and a residence time of about 60 to about 300 minutes.

9. An ion exchange material made according to the method of claim 1.

10. A method of making an ion exchange material comprising:
    (1) forming a mixture of a ceramic powder with a binder and a moiety which includes an element selected from the group consisting of sulfur, carbon, phosphorus, nitrogen, and mixtures thereof;
    (2) heating said mixture in a non-oxidizing atmosphere at a temperature up to 1000° C., whereby said binder is driven off, said ceramic powder is sintered to form a solid shape, and ion exchange sites are trapped within a ceramic matrix; and
    (3) oxidizing or reducing said solid, as necessary, so that said sulfur is present as sulfate, said carbon is present as carboxylate or carbonate, said phosphorus is present as phosphate, and said nitrogen is present as amine or amide.

11. A method according to claim 10 wherein said ceramic material is selected from the group consisting of zirconia, hafnia, titania, alumina, silica, and mixtures thereof.

12. A method according to claim 10 wherein said ceramic material is zirconia.

13. A method according to claim 10 wherein said ceramic material is silica.

14. A method according to claim 10 wherein said ceramic material has a particle size of about 400 to about 20 mesh.

15. An ion exchange material made according to the method of claim 10.

* * * * *